(12) United States Patent
Yagi et al.

(10) Patent No.: US 7,917,704 B2
(45) Date of Patent: *Mar. 29, 2011

(54) STORAGE MANAGEMENT METHOD AND STORAGE MANAGEMENT SYSTEM

(75) Inventors: Shuichi Yagi, Matsuda (JP); Kozue Fujii, Odawara (JP); Tatsuya Murakami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 12/179,834

(22) Filed: Jul. 25, 2008

(65) Prior Publication Data

US 2008/0282043 A1 Nov. 13, 2008

Related U.S. Application Data

(63) Continuation of application No. 11/723,453, filed on Mar. 20, 2007, now Pat. No. 7,415,578, which is a continuation of application No. 11/435,143, filed on May 17, 2006, now Pat. No. 7,287,129, which is a continuation of application No. 10/849,482, filed on May 20, 2004, now Pat. No. 7,185,142.

(30) Foreign Application Priority Data

Mar. 17, 2004 (JP) .................................. 2004-075866

(51) Int. Cl.
G06F 12/10 (2006.01)

(52) U.S. Cl. ..................................................... 711/147

(58) Field of Classification Search ........................ None
See application file for complete search history.

(56) References Cited

U.S. PATENT DOCUMENTS

| | | | |
|---|---|---|---|
| 5,210,844 A | 5/1993 | Shimura et al. |
| 5,568,629 A | 10/1996 | Gentry et al. |
| 5,592,638 A | 1/1997 | Onodera |
| 5,657,470 A | 8/1997 | Fisherman et al. |
| 5,659,786 A | 8/1997 | George et al. |
| 5,704,055 A | 12/1997 | George et al. |
| 5,765,153 A | 6/1998 | Benantar et al. |
| 5,790,852 A | 8/1998 | Salm |
| 5,829,053 A | 10/1998 | Smith et al. |
| 5,973,690 A | 10/1999 | Ofer |

(Continued)

FOREIGN PATENT DOCUMENTS

DE 10014448 11/2000

(Continued)

OTHER PUBLICATIONS

Decision of Rejection in Japanese Application No. 2004-075866 mailed Apr. 27, 2010.

(Continued)

*Primary Examiner* — Duc T Doan
(74) *Attorney, Agent, or Firm* — Brundidge & Stanger, P.C.

(57) ABSTRACT

There is provided a storage management system capable of utilizing division management with enhanced flexibility and of enhancing security of the entire system, by providing functions by program products in each division unit of a storage subsystem. The storage management system has a program-product management table stored in a shared memory in the storage subsystem and showing presence or absence of the program products, which provide management functions of respective resources to respective SLPRs. At the time of executing the management functions by the program products in the SLPRs of users in accordance with instructions from the users, the storage management system is referred to and execution of the management function having no program product is restricted.

10 Claims, 9 Drawing Sheets

U.S. PATENT DOCUMENTS

| | | | |
|---|---|---|---|
| 6,021,481 A | 2/2000 | Eickemeyer et al. | |
| 6,148,368 A | 11/2000 | DeKoning | |
| 6,247,109 B1 | 6/2001 | Kleinsorge et al. | |
| 6,275,824 B1 | 8/2001 | O'Flaherty et al. | |
| 6,275,825 B1 | 8/2001 | Kobayashi et al. | |
| 6,275,898 B1 | 8/2001 | DeKoning | |
| 6,279,046 B1 | 8/2001 | Armstrong et al. | |
| 6,289,398 B1 | 9/2001 | Stallmo et al. | |
| 6,330,653 B1 | 12/2001 | Murray et al. | |
| 6,341,331 B1 | 1/2002 | McNutt | |
| 6,343,324 B1 | 1/2002 | Hubis et al. | |
| 6,347,358 B1 | 2/2002 | Kuwata | |
| 6,425,049 B1 | 7/2002 | Yamamoto et al. | |
| 6,438,671 B1 | 8/2002 | Doing et al. | |
| 6,457,102 B1 | 9/2002 | Lambright et al. | |
| 6,484,173 B1 | 11/2002 | O'Hare et al. | |
| 6,484,245 B1 | 11/2002 | Sanada | |
| 6,502,162 B2 | 12/2002 | Blumenau et al. | |
| 6,502,193 B1 | 12/2002 | Barber | |
| 6,507,896 B2 | 1/2003 | Sanada | |
| 6,507,905 B1 | 1/2003 | Hubacher et al. | |
| 6,519,679 B2 | 2/2003 | Devireddy et al. | |
| 6,523,096 B2 | 2/2003 | Sanada et al. | |
| 6,542,926 B2 | 4/2003 | Zalewski et al. | |
| 6,542,961 B1 | 4/2003 | Matsunami | |
| 6,594,775 B1 | 7/2003 | Fair | |
| 6,604,165 B1 | 8/2003 | Terao | |
| 6,606,690 B2 | 8/2003 | Padovano | |
| 6,606,695 B2 | 8/2003 | Kamano | |
| 6,609,180 B2 | 8/2003 | Sanada et al. | |
| 6,615,324 B1 | 9/2003 | Fernald | |
| 6,640,278 B1 | 10/2003 | Nolan et al. | |
| 6,665,786 B2 | 12/2003 | McMichael et al. | |
| 6,671,776 B1 | 12/2003 | DeKoning | |
| 6,684,209 B1 | 1/2004 | Ito et al. | |
| 6,690,400 B1 | 2/2004 | Moayyad et al. | |
| 6,691,209 B1 | 2/2004 | O'Connell | |
| 6,701,410 B2 | 3/2004 | Matsunami et al. | |
| 6,701,411 B2 | 3/2004 | Matsunami et al. | |
| 6,715,031 B2 | 3/2004 | Camble et al. | |
| 6,718,481 B1 | 4/2004 | Fair | |
| 6,725,352 B2 | 4/2004 | Goodman et al. | |
| 6,728,836 B1 | 4/2004 | Lambright et al. | |
| 6,728,844 B2 | 4/2004 | Sanada et al. | |
| 6,738,854 B2 | 5/2004 | Hoese et al. | |
| 6,742,034 B1* | 5/2004 | Schubert et al. | 709/226 |
| 6,742,090 B2 | 5/2004 | Sanada et al. | |
| 6,754,776 B2 | 6/2004 | Conway et al. | |
| 6,763,419 B2 | 7/2004 | Hoese et al. | |
| 6,772,287 B2 | 8/2004 | Uchiyama et al. | |
| 6,839,796 B2 | 1/2005 | Dawson et al. | |
| 6,851,022 B2 | 2/2005 | Ikeuchi et al. | |
| 6,851,029 B2 | 2/2005 | Matsunami et al. | |
| 6,865,157 B1 | 3/2005 | Scott | |
| 6,877,073 B2 | 4/2005 | Sanada | |
| 6,898,672 B2 | 5/2005 | Lambright et al. | |
| 6,904,470 B1 | 6/2005 | Ofer | |
| 6,910,102 B2 | 6/2005 | Matsunami | |
| 7,376,898 B1* | 5/2008 | Yehuda et al. | 715/741 |
| 2001/0008010 A1 | 7/2001 | Sanada et al. | |
| 2001/0011332 A1 | 8/2001 | Sanada et al. | |
| 2001/0011333 A1 | 8/2001 | Sanada et al. | |
| 2001/0020254 A1 | 9/2001 | Blumenau et al. | |
| 2001/0027501 A1 | 10/2001 | O'Hare et al. | |
| 2001/0047463 A1 | 11/2001 | Kamano | |
| 2001/0047482 A1 | 11/2001 | Harris et al. | |
| 2002/0007366 A1 | 1/2002 | Fontijn | |
| 2002/0010843 A1 | 1/2002 | Sanada | |
| 2002/0016812 A1 | 2/2002 | Uchishiba et al. | |
| 2002/0052914 A1 | 5/2002 | Zalewski et al. | |
| 2002/0065982 A1 | 5/2002 | Colligan | |
| 2002/0083270 A1 | 6/2002 | Chilton | |
| 2002/0083285 A1 | 6/2002 | Sanada | |
| 2002/0091828 A1* | 7/2002 | Kitamura et al. | 709/226 |
| 2002/0091898 A1 | 7/2002 | Matsunami | |
| 2002/0095549 A1 | 7/2002 | Matsunami | |
| 2002/0095602 A1 | 7/2002 | Pherson et al. | |
| 2002/0099837 A1 | 7/2002 | Oe et al. | |
| 2002/0099914 A1 | 7/2002 | Matsunami et al. | |
| 2002/0103913 A1 | 8/2002 | Tawil et al. | |
| 2002/0104008 A1 | 8/2002 | Cochran et al. | |
| 2002/0107810 A1* | 8/2002 | Nishio et al. | 705/59 |
| 2002/0124040 A1 | 9/2002 | Foster et al. | |
| 2002/0133539 A1 | 9/2002 | Monday | |
| 2002/0161891 A1 | 10/2002 | Higuchi et al. | |
| 2002/0178143 A1 | 11/2002 | Fujimoto | |
| 2003/0005456 A1 | 1/2003 | Naganuma et al. | |
| 2003/0009648 A1 | 1/2003 | Doing et al. | |
| 2003/0014600 A1 | 1/2003 | Ito et al. | |
| 2003/0023868 A1 | 1/2003 | Parent | |
| 2003/0055933 A1 | 3/2003 | Ishizaki et al. | |
| 2003/0055972 A1 | 3/2003 | Fuller et al. | |
| 2003/0065898 A1 | 4/2003 | Flamma et al. | |
| 2003/0084241 A1 | 5/2003 | Lubbers et al. | |
| 2003/0097393 A1 | 5/2003 | Kawamoto et al. | |
| 2003/0110254 A1 | 6/2003 | Fujita et al. | |
| 2003/0110263 A1 | 6/2003 | Shillo | |
| 2003/0115218 A1 | 6/2003 | Bobbitt et al. | |
| 2003/0115282 A1 | 6/2003 | Rose | |
| 2003/0115434 A1 | 6/2003 | Mahalingam et al. | |
| 2003/0115438 A1 | 6/2003 | Mahalingam et al. | |
| 2003/0115447 A1 | 6/2003 | Pham et al. | |
| 2003/0120743 A1 | 6/2003 | Coatney | |
| 2003/0120751 A1 | 6/2003 | Husain et al. | |
| 2003/0131182 A1 | 7/2003 | Kumar et al. | |
| 2003/0172069 A1 | 9/2003 | Uchiyama et al. | |
| 2003/0177176 A1 | 9/2003 | Hirschfeld et al. | |
| 2003/0182501 A1 | 9/2003 | George et al. | |
| 2003/0191910 A1 | 10/2003 | Matsunami | |
| 2003/0196055 A1 | 10/2003 | Kamano et al. | |
| 2003/0225934 A1 | 12/2003 | Kaji | |
| 2003/0229698 A1 | 12/2003 | Furuhashi | |
| 2003/0229764 A1 | 12/2003 | Ohno et al. | |
| 2004/0003063 A1 | 1/2004 | Ashok et al. | |
| 2004/0010563 A1 | 1/2004 | Forte et al. | |
| 2004/0049564 A1 | 3/2004 | Ng et al. | |
| 2004/0064729 A1 | 4/2004 | Yellepeddy | |
| 2004/0088417 A1 | 5/2004 | Bober et al. | |
| 2004/0111557 A1 | 6/2004 | Nakatani et al. | |
| 2004/0111580 A1 | 6/2004 | Weber et al. | |
| 2004/0111596 A1 | 6/2004 | Rawson, III | |
| 2004/0139168 A1 | 7/2004 | Tanaka et al. | |
| 2004/0153605 A1 | 8/2004 | Nakamura | |
| 2004/0153710 A1 | 8/2004 | Fair | |
| 2004/0158673 A1 | 8/2004 | Matsunami | |
| 2004/0163028 A1 | 8/2004 | Olarig | |
| 2004/0168033 A1 | 8/2004 | Sanada | |
| 2004/0181589 A1 | 9/2004 | Suleiman | |
| 2004/0193803 A1 | 9/2004 | Mogi et al. | |
| 2004/0199736 A1 | 10/2004 | Kamano | |
| 2004/0210591 A1 | 10/2004 | Hirschfeld et al. | |
| 2004/0212511 A1 | 10/2004 | Ahrens et al. | |
| 2004/0215859 A1 | 10/2004 | Armstrong et al. | |
| 2004/0215860 A1 | 10/2004 | Armstrong et al. | |
| 2004/0215915 A1 | 10/2004 | Block et al. | |
| 2005/0005064 A1 | 1/2005 | Ito et al. | |
| 2005/0010722 A1 | 1/2005 | Chen | |
| 2005/0015546 A1 | 1/2005 | Zohar et al. | |
| 2005/0021727 A1 | 1/2005 | Matsunami et al. | |
| 2005/0033914 A1 | 2/2005 | Matsunami | |
| 2005/0050085 A1 | 3/2005 | Shimada et al. | |
| 2005/0071446 A1 | 3/2005 | Graham et al. | |
| 2005/0120171 A1 | 6/2005 | Yasukawa et al. | |
| 2005/0149677 A1 | 7/2005 | Shimada et al. | |
| 2005/0166074 A1 | 7/2005 | Hack | |
| 2005/0172052 A1 | 8/2005 | Sanada | |

FOREIGN PATENT DOCUMENTS

| | | |
|---|---|---|
| EP | 1321848 | 12/2002 |
| EP | 1341074 | 9/2003 |
| JP | 5-128002 | 5/1993 |
| JP | 10-228352 | 8/1998 |
| JP | 2002-149599 | 5/2002 |
| JP | 2002-230189 | 8/2002 |
| JP | 2002-259214 | 9/2002 |
| JP | 2003-30053 | 1/2003 |
| JP | 2003-157177 | 5/2003 |

| JP | 2003-177963 | 6/2003 |
| JP | 2003-30622 | 11/2003 |
| JP | 2003-330622 | 11/2003 |
| JP | 2005-128733 | 5/2005 |
| WO | 02/35359 | 5/2002 |

OTHER PUBLICATIONS

Office Action in Japanese Patent Application No. 2004-075866 issued Feb. 2, 2010.

B.W. Lampson, "Protection" Operating Systems Review, ACM Press, XX, vol. 8, No. 1, Jan. 1974, pp. 18-24.

"Freedom Storage Lightning 9900 V Series", User and Reference Guide, Hitachi Data Systems Corp. 2002, pp. iii-124.

Buck, A.L. et al., "The Storage Server as Virtual Volume Manager", IEEE Comput. Soc. Apr. 1993, USA 26-29, pp. 79-86.

Gelb, J.P. "System-Managed Storage", IBM Systems Journal, vol. 28, No. 1, Jan. 1989, pp. 77-103.

Kaczmarski, M. et al., "Beyond Backup Toward Storage Management", IBM Systems Journal, vol. 42, No. 2, 2003, pp. 322-337.

Rangel, G., "Hitachi Freedom Storage: Thunder 9200 Architecture and Performance Configuration Guidelines", Hitachi Data Systems, 2001, pp. 1-27.

Swartz, K., "Multiple Volumes and Multiple RAID Groups on NetApp Fliers", Network Appliance Report TR 3027, no date, from Google cache online.

* cited by examiner

FIG. 4
Program-Product Management Table

| Division Identifier | Function(P.P.) | P.P.Flag |
|---|---|---|
| SLPRA | LUNM Function | ON |
| SLPRA | CVS Function | ON |
| SLPRA | DCR Function | ON |
| SLPRA | HORC Function | ON |
| SLPRA | HRC Function | ON |
| : | : | : |
| SLPRB | LUNM Function | ON |
| SLPRB | CVS Function | ON |
| SLPRB | DCR Function | ON |
| SLPRB | HORC Function | ON |
| SLPRB | HRC Function | ON |
| : | : | : |
| SLPRC | LUNM Function | ON |
| SLPRC | CVS Function | ON |
| SLPRC | DCR Function | OFF |
| SLPRC | HORC Function | OFF |
| SLPRC | HRC Function | OFF |
| : | : | : |

FIG. 5
Division-Resource Management Table

| Division Identifier | Management Resource |
|---|---|
| SLPRA | PORT A |
| SLPRA | CACHE A |
| SLPRA | ECC Group A |
| SLPRB | PORT B |
| SLPRB | CACHE B |
| SLPRB | ECC Group B |
| SLPRC | PORT C |
| SLPRC | CACHE C |
| SLPRC | ECC Group C |

STORAGE MANAGEMENT METHOD AND STORAGE MANAGEMENT SYSTEM

This application is a continuation application of U.S. application Ser. No. 11/723,453, filed Mar. 20, 2007, now U.S. Pat. No. 7,415,578, which is a continuation application of U.S. application Ser. No. 11/435,143, filed May 17, 2006, now U.S. Pat. No. 7,287,129, which is a continuation of Ser. No. 10/849,482, filed May 20, 2004, now U.S. Pat. No. 7,185,142, the entirety of which are incorporated herein by reference.

CROSS-REFERENCE TO RELATED APPLICATION

The present application claims priority from Japanese Patent Application No. JP 2004-075866 filed on Mar. 17, 2004, the content of which is hereby incorporated by reference into this application.

BACKGROUND OF THE INVENTION

The present invention relates to a storage management method for a storage subsystem and a storage management system and, particularly, to a technique effectively applied to storage management used when logical resources and physical resources of a single storage subsystem are divided for operation.

With recent advance of large amounts of storage subsystem, as observed in utilizing storage service providers, there has been carried out such utilization that a single storage subsystem is shared by a plurality of customers. In this utilization, individual system administrators independently manage resources allocated for each customer.

To carry out the utilization with security and efficiency, division management is not implemented by a utilizing method or storage management software, but the storage subsystem itself is such that it has resource-dividing management functions.

Conventionally, as a storage management technique for the storage subsystem having such resource-dividing management functions, regarding a service function provided to a user of storage resources from a service provider, Japanese Patent Laid-open No. 2002-230189 (Patent Document 1) discloses a technique of a service provision system, which can manage and control the number of users available for the individual service functions of the storage subsystem and the total amount of storage resources used by the service users, thereby imposing appropriate licenses on the service function that the service provider provides to the user.

Additionally, Japanese Patent Laid-open No. 2002-259214 (Patent Document 2) discloses a technique for controlling access to a storage device, the technique being such that control-system calling access to a data storage device from a host system is controlled by access restriction preset and devices which the access permits to each user and actions which are permitted by the access can be controlled.

SUMMARY OF THE INVENTION

Conventionally, when a plurality of users manage a storage subsystem having resource-dividing management functions, an access guard of other users to the resources has been made.

Also, the configuration information of a disk subsystem is managed using storage management software, and management functions in each resource (such as an input/output port, a physical disk, and a cache memory) of the disk subsystem are individually provided in the form of a program product (hereinafter, referred to as a "P.P.").

Further, in the storage subsystem having the resource-dividing management functions, program products that each user uses are different from one another, so that the management of the program products to each user is also required.

However, the techniques disclosed in Patent Documents 1 and 2 are intended to carry out resource management for end users' servers etc. host-connected to the storage subsystems. The management for the program products provided on a side of managing the storage subsystems is carried out in units of the storage subsystem. Thus, the techniques are not intended to make functional provision by the program products different in division units of the storage subsystems.

An object of the present invention is to provide a storage management system, which can utilize more flexible division management by making the functional provision of the program products in division units of the storage subsystem and can enhance security of the entire system.

A storage management method according to the present invention comprises the steps of: storing, in a shared memory in a storage subsystem, a program-product management table showing presence or absence of a program product providing a management function of each resource to a division unit; and managing execution of the program product in each division unit based on the program-product management table.

A storage management method according to the present invention, which divides a physical resource and a logical resource in a storage subsystem, allocates a user per division unit, and performs division management of each of the resources, the storage subsystem having a plurality of channel adapters, a plurality of disk adapters, a shared memory, a cache memory, a physical disk connected to the disk adapters, and a switch for connecting the plurality of channel adapters, the plurality of disk adapters, the shared memory, and the cache memory, comprises the steps of: storing, in the shared memory in the storage subsystem, a program-product management table showing presence or absence of a program product providing a management function of each of the resources to the division unit; referring to the program-product management table at the time of executing a management function by the program product in the division unit of the user in accordance with an instruction from the user; and restricting execution of the management function without the program product.

Further, a storage management system according to the present invention, which divides a physical resource and a logical resource in a storage subsystem, allocates a user per division unit, and performs division management of each of the resources, the storage subsystem having a plurality of channel adapters, a plurality of disk adapters, a shared memory, a cache memory, a physical disk connected to the disk adapters, and a switch for connecting the plurality of channel adapters, the plurality of disk adapters, the shared memory, and the cache memory, comprises: a program-product management table stored in the shared memory in the storage subsystem and showing presence or absence of a program product providing a management function of each of the resources to the division unit, wherein, at the time of executing the management function by the program product in the division unit of the user in accordance with an instruction from the user, the storage management system is referred to restrict execution of the management function without the program-product management table.

BRIEF DESCRIPTION OF THE DRAWINGS

FIG. 4 is a view showing an example of a program-product management table in the storage management system according to the embodiment of the present invention.

FIG. 5 is a view showing an example of a division-resource management table in the storage management system according to the embodiment of the present invention.

DESCRIPTION OF THE PREFERRED EMBODIMENTS

Hereinafter, an embodiment of the present invention will be detailed based on the drawings. Note that the same members are denoted in principle by the same reference symbol through all the drawings for describing the embodiment and the repetitive explanation thereof will be omitted.

<Configuration of Storage Management System>

Figure 1:
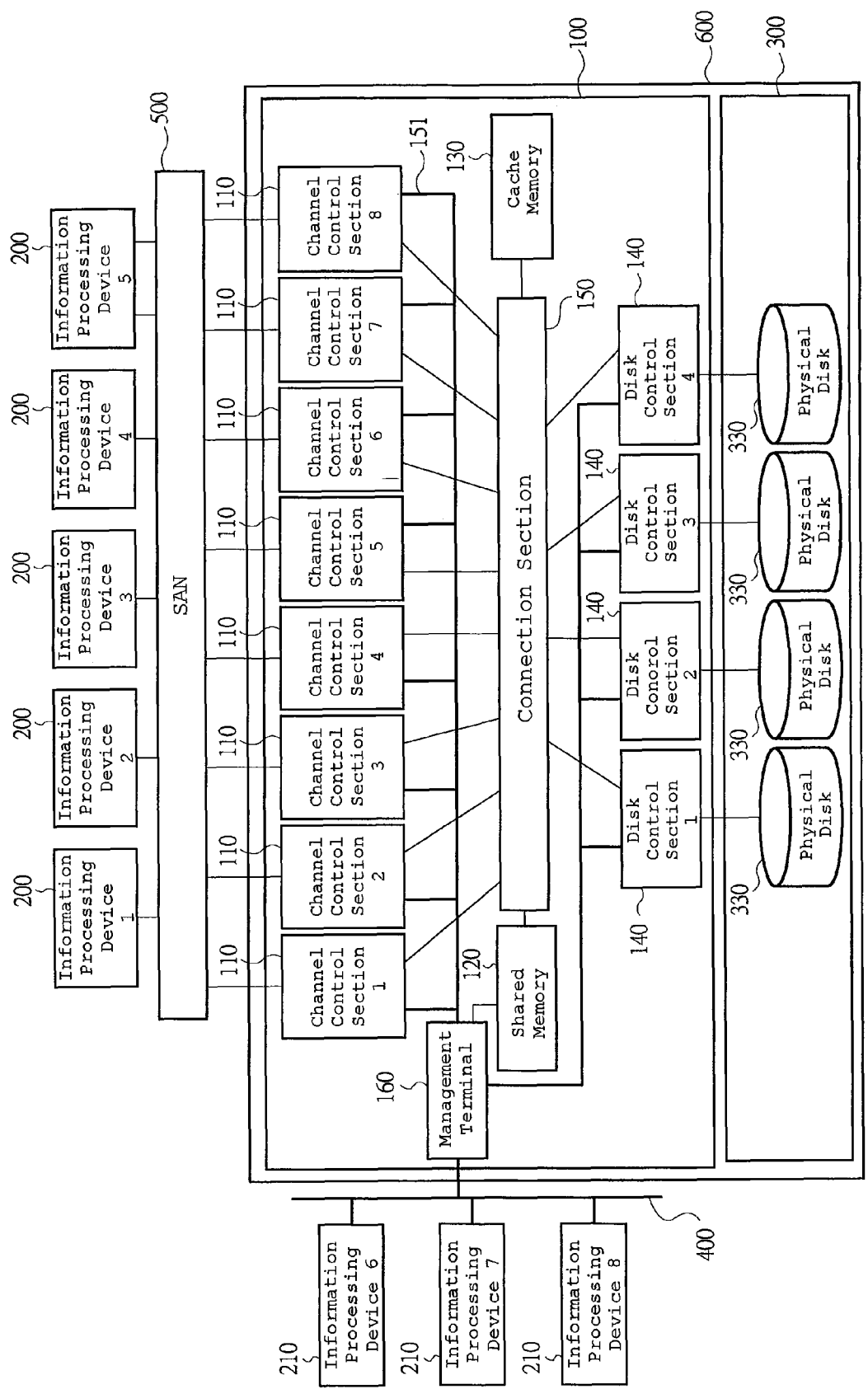
FIG. 1 is a block diagram showing a configuration of a storage management system according to an embodiment of the present invention.

First, the configuration of a storage management system according to an embodiment of the present invention will be described with reference to FIG. 1. FIG. 1 is a block diagram showing the configuration of the storage management system according to an embodiment of the present invention.

In FIG. 1, a storage management system comprises: a storage subsystem 600 including a storage control device 100 and a storage driving device 300; information processing devices 200; information processing devices 210; and a SAN 500.

The storage control device 100 comprises a plurality of channel control sections (channel adapter: CHA) 110, a shared memory (SM) 120, a cache memory (CACHE) 130, a plurality of disk control sections (disk adapter: DKA) 140, a connection section 150, and a management terminal (service processor: SVP) 160.

The storage control device 100 establishes communication with the information processing devices 1 to 5 (200) via the SAN 500 by using the channel control sections 1 to 8 (110). For example, the storage control device 100 controls the storage driving device 300 in response to commands received from the information processing devices 200. Additionally, after receiving data input/output requests from the information processing devices 1 to 5 (200), the storage control device 100 reads/writes data stored into physical disk drives 330 provided in the storage driving device 300. Further, for example, after receiving various commands from the information processing devices 6 to 8 (210) for managing the storage subsystem 600, the storage control device 100 configures various settings of the storage subsystem 600.

The channel control section 110 includes a communication interface for establishing communication with the respective information processing devices 200, and has a function of exchanging data input/output commands etc. with the information processing devices 200.

The respective channel control sections 110 and the management terminal 160 are coupled with one another via an internal LAN 151. Thereby, micro-programs etc. to be executed by the channel control sections 110 can be installed by being transmitted from the management terminal 160. The configuration of the channel control section 110 will be described later.

The connection section 150 interconnects the channel control sections 110, the shared memory 120, the cache memory 130, the disk control sections 140, and the management terminal 160. Data and commands are exchanged among the channel control sections 110, the shared memory 120, the cache memory 130, the disk control sections 140, and the management terminal 160 via the connection section 150. The connection section 150 comprises a cross-bus switch, for example.

The shared memory 120 and the cache memory 130 are storage memories shared by the channel control sections 110 and the disk control sections 140. More specifically, the shared memory 120 is primarily used to store control information and commands, etc. whereas the cache memory 130 is primarily used to store data.

For example, if a data input/output request that one of the channel control sections 110 has received from one of the information processing devices 200 is a write command, the above-mentioned channel control section 110 writes the write command into the shared memory 120 and concurrently writes, into the cache memory 130, write data received from the information processing device 200. Meanwhile, the disk control sections 140 monitor the shared memory 120, and, when detecting that the write command is written into the shared memory 120, reads the write data from the cache memory 130 in accordance with the above-mentioned command and writes it into the storage driving device 300.

Also, when the data input/output request that the channel control section 110 has received from the information processing device 200 is a read command, the channel control section 110 checks as to whether data to be read-target is present in the cache memory 130 or not. If the data to be read-target is present in the cache memory 130, the channel control section 110 transmits the data to the information processing device 200. Meanwhile, if the data to be read-target is absent in the cache memory 130, the channel control section 110 writes the read command into the shared memory 120 and concurrently monitors the shared memory 120. The disk control section 140, which has detected that the read command is written into the shared memory 120, reads data to be read-target from the storage driving device 300 and writes it into the cache memory 130 and concurrently writes that effect into the shared memory 120. Further, when detecting that the data to be read-target is written into the cache memory 130, the channel control section 110 transmits the data to the information processing device 200.

Thus, the data is exchanged between the channel control section 110 and the disk control section 140 via the cache memory 130. The data read/written by the channel control sections 110 and the disk control sections 140 among the data to be stored in the physical disk drives 330 is stored in the cache memory 130.

Note that, besides the configuration in which instructions to write/read the data from the channel control sections 110 to the disk control sections 140 are indirectly executed via the shared memory 120, for example, there may also be a configuration in which instructions to write/read the data from the channel control sections 110 to the disk control sections 140 are directly executed without interposing the shared memory 120.

Additionally, a structure obtained by adding the channel control section 110 to a function of the disk control section 140 may be used as a data input/output control section.

The disk control sections 140 are communicably connected to a plurality of physical disk drives 330 for storing data, thereby controlling the storage driving device 300. For example, as described above, the channel control sections 110 read/write data with respect to the physical disk drives 330, in response to the data input/output requests received from the information processing devices 200.

The disk control sections 140 are connected to the management terminal 160 via the internal LAN 151 and thereby can establish communication with one another. For this reason, micro-programs etc. to be executed by the disk control sections 140 can be installed by being transmitted from the management terminal 160.

The management terminal 160 is a computer performing maintenance and/or management to the storage subsystem 600. By operating the management terminal 160, for example, an operator can perform: setting of the configurations of the physical disk drives 330 in the storage driving device 300; setting of paths serving as communication paths between the information processing devices 200 and the channel control sections 110; setting of logical volumes; installation of the micro-programs executed in the channel control sections 110 and/or the disk control sections 140; and the like.

The setting of the configurations of the physical disk drives 330 in the storage driving device 300 may include, for example, an increase or reduction of the physical disk drives 330, and alteration of configurations of the RAID (alteration of RAID 1 to RAID 5), etc. Additionally, through the management terminal 160, there can be performed various operations which are verification of an operation state of and designation of failure parts in the storage subsystem 600, and installation of operating systems to be executed in the channel control sections 110. The above-mentioned setting and control can be performed, by operators etc., from an interface provided in the management terminal 160 or from user interfaces of the information processing devices 6 to 8 (210) that display Web pages provided by a Web server operating in the management terminal 160. Additionally, by operating the management terminal 160, the operators or the like can perform setting of targets to be fault-monitored, setting of the contents thereof, and setting of a fault-notification destination, etc.

Each of the information processing devices 200 is an information processing device such as a computer having a CPU (central processing unit) and a memory. Various functions are implemented through execution of various types of programs by the CPU provided in the information processing device 200. The information processing device 200 may be, for example, a personal computer, a workstation, or a mainframe computer. Each of the information processing devices 1 to 5 (200) is used as, for example, a nucleus computer in an automatic depository/disbursement system in a bank or in an aircraft seat reservation system. The information processing devices 6 to 8 (210) are used as management clients for maintenance and/or management of the storage subsystem 600.

In this case, the information processing devices 200 and 210 may be information processing devices 200 and 210 for different users. For example, the information processing devices 1 to 2 (200) and the information processing device 6 (210) may be used as the information processing devices 200 and 210 for a user A; and the information processing devices 3 to 5 (200) and the information processing device 7 (210) may be used as the information processing devices 200 and 210 for a user B. The information processing device 8 (210) may be used as the information processing device 210 for a storage administrator managing the entirety of the storage subsystem 600. The user herein may be, for example, a business enterprise, alternatively a section/department in the business enterprise, still alternatively an individual person.

The storage driving device 300 has a large number of physical disk drives 330, whereby mass storage areas can be provided to the information processing devices 200. The physical disk drive 330 may be a storage medium such as a hard disk drive, or may be composed of a plurality of hard disk drives constituting RAIDs (redundant arrays of inexpensive disks) (a plurality of hard disk drives constituting one RAID will be hereafter referred to as an "ECC group").

A portion between the storage control device 100 and the storage driving device 300 may be directly connected as shown in FIG. 1, or may be connected via a network. Still alternatively, the storage driving device 300 may be configured integrally with the storage control device 100.

The information processing devices 1 to 5 (200) are communicably connected to the storage control device 100 via the SAN 500. The SAN 500 is a network used to exchange data between the storage driving device 300 and the information processing devices 1 to 5 (200) in units of a block, which is a management unit of the data in storage resources provided by the storage driving device 300. The communication between the information processing devices 1 to 5 (200) and the storage control device 100, established via the SAN 500, may be performed in accordance with a fiber channel protocol.

Of course, portions between the information processing devices 1 to 5 (200) and the storage control device 100 need not be connected via the SAN 500, and may be connected, for example, via a LAN or directly without a network. In the case of connection via the LAN, the portions may be connected communicably in accordance with, for example, a TCP/IP (transmission control protocol/internet protocol).

Or, in the case of direct connection without the network, the portions may be connected communicably in accordance with a communication protocol such as FICON (Fiber Connection) (trademark registration), ESCON (Enterprise System Connection) (trademark registration), ACONARC (Advanced Connection Architecture) (trademark registration), or FIBARC (Fiber Connection Architecture) (trademark registration).

Further, the information processing devices 6 to 8 (210) are connected to the storage control device 100 via a LAN 400. The LAN 400 may be the Internet or a dedicated network. For example, the communication between the information processing devices 6 to 8 (210) and the storage control device 100, established via the LAN 400, may be performed in accordance with the TCP/IP protocol.

Note that, this embodiment has been described with reference to the configuration in which the shared memory 120 and the cache memory 130 are provided independently of the channel control sections 110 and the disk control sections 140. However, this embodiment is not limited to the above-described configuration, and there may be preferably formed such a configuration that the shared memory 120 or the cache memory 130 is distributed and provided to the individual channel control sections 110 and disk control sections 140. In this case, the connection section 150 interconnects the channel control sections 110 and the disk control sections 140 that have the distributed shared memory 120 or cache memory 130.

Additionally, at least any one of the channel control sections 110, the disk control sections 140, the connection section 150, the shared memory 120, and the cache memory 130 may be integrally formed.

Further, the management terminal 160 may be built in the storage control device 100 or be externally connected. Alternatively, the management terminal 160 may be a computer dedicated for maintenance and/or management of the storage control device 100 and the storage driving device 300, or be a general-purpose computer to which a maintenance and/or management function is imparted.

<Configuration of Channel Control Section>

Figure 2:
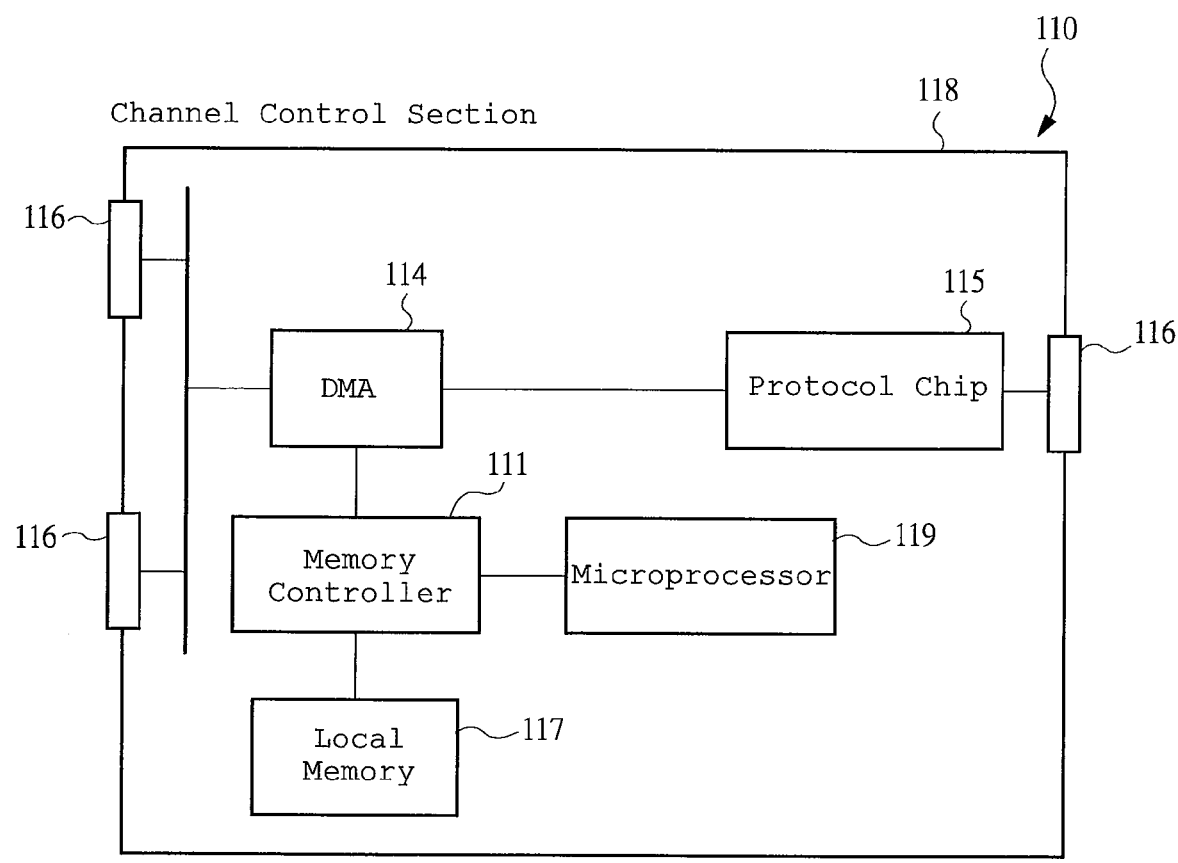
FIG. 2 is a block diagram showing a configuration of a channel control section in the storage management system according to the embodiment of the invention.

Next, an example of the configuration of the channel control section 110 will be described with reference to FIG. 2. FIG. 2 is a configuration view showing the configuration of the channel control section 110.

In FIG. 2, the channel control section 110 is configured as a unitized board having a circuit board 118. Specifically, the channel control section 110 is configured to include one or more circuit boards 118. On each circuit board 118, there are formed a microprocessor (MP) 119, a protocol chip 115, a DMA (direct memory access) 114, a local memory (LM) 117, a memory controller 111, and connectors 116.

The protocol chip 115 provides a communication interface function used for establishing communication with the information processing devices 200. For example, in accordance with a fiber channel protocol, the protocol chip 115 receives data input/output requests transmitted from the information processing devices 200, and controls transmission/reception of data. The connector 116 to be connected to the protocol chip 115 constitutes a communication port communicably connected to any one of the plurality of information processing devices 200.

The microprocessor 119, the local memory 117, the DMA 114, and the memory controller 111 each receive a data input/output request for data to be stored in the physical disk drive 330 from the information processing device 200 through the communication port, and exchange data, commands, and/or the like among the disk control section 140, the cache memory 130, the shared memory 120, and the management terminal 160, for example.

The DMA 114 executes, in response to instructions from the microprocessor 119, transfer of the data transmitted from the information processing devices 200 to the cache memory 130, and transmission of the data stored in the cache memory 130 to the information processing devices 200.

The connector 116 to be connected to the DMA 114 is coupled to a connector on a side of the storage control device 100, whereby the channel control sections 110 are electrically connected to the connection section 150 of the storage control device 100 and to the management terminal 160.

Note that configurations and operations of individual portions other than those described above, and a basic operation of the storage subsystem 600 are detailed in Japanese Patent Application No. 2003-400515, which is incorporated herein.

<Basic Operation of Storage Management System>

Next, a basic operation of a storage management system according to one embodiment of the present invention will be described with reference to FIGS. 3 to 5.

Figure 3:
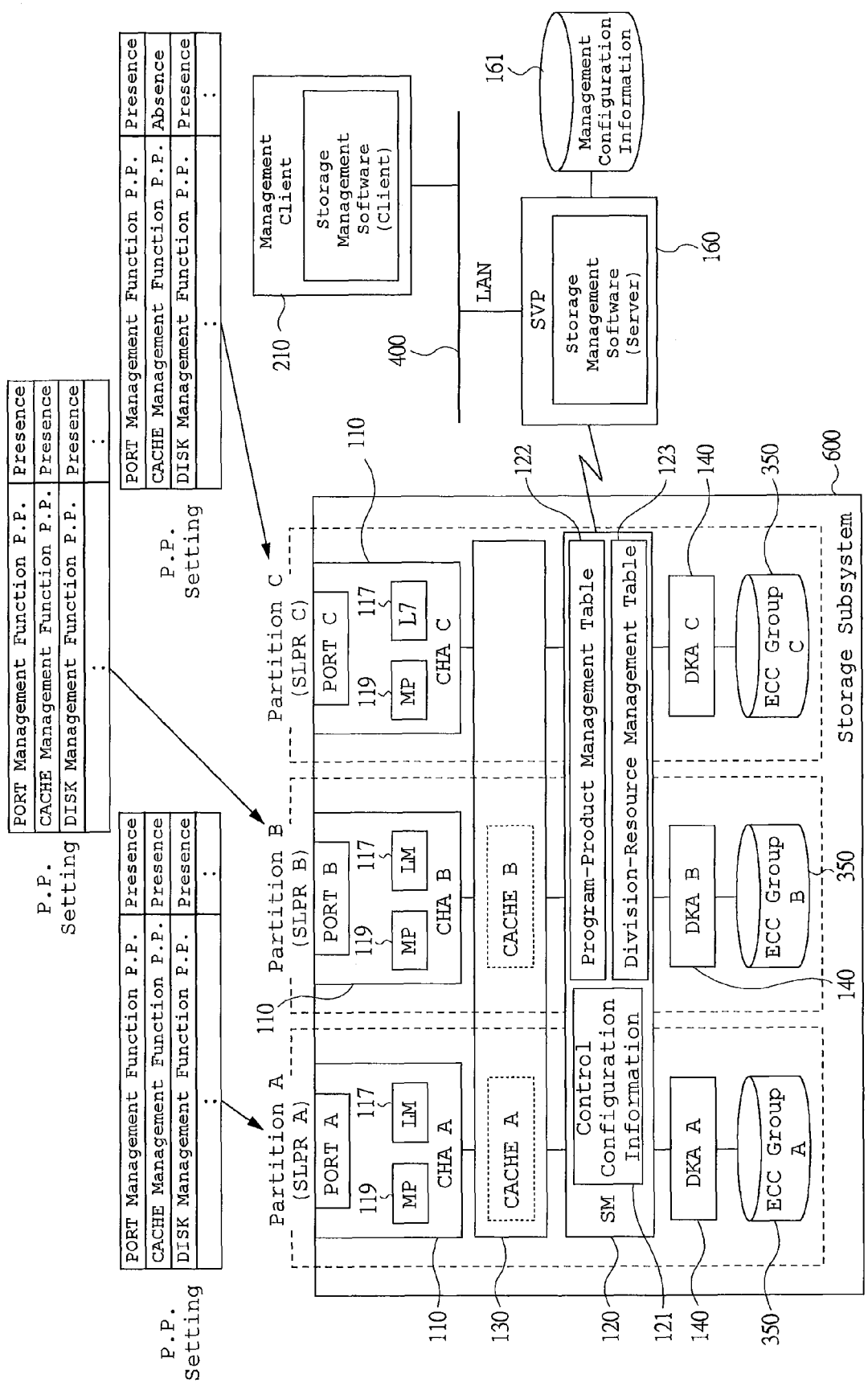
FIG. 3 is an explanatory view for explaining an operation of the storage management system according to the embodiment of the invention.

FIG. 3 is an explanatory view for explaining operations of a storage management system according to one embodiment of the present invention, and shows the simplified configuration in FIG. 1 for their explanation. FIG. 4 is a view showing an example of a program-product management table, and FIG. 5 is a view showing an example of a division-resource management table 123.

First, as shown in FIG. 3, the present embodiment includes, in the storage subsystem 600, the channel control sections (CHA) 110, the cache memory (CACHE) 130, the disk control sections (DKA) 140, and ECC groups 350 formed by the plurality of physical disk drives 330 each constituting the RAID, wherein respective resources of the ECC groups 350 are divided into three division units (hereinafter each abbreviated as "SLPR"), that is, into Partition A, Partition B, and Partition C so that the shared memory (SM) 120 can be accessed from the respective resources of the SLPRs.

The users' Information processing devices 200 to which the SLPRs are individually allocated are connected to ports (PORT) in the channel control sections (CHA) 110 in the individual SLPRs, whereby utilization and management for the respective resources are made in the SLPRs for each user.

In the shared memory (SM) 120, there are stored: control configuration information 121 for controlling the storage subsystem 600; a program-product management table 122 in which validity/invalidity of a program product for each SLPR as shown in FIG. 4 is set; and a division-resource management table 123 in which a resource to be managed in each SLPR as shown in FIG. 5 is set.

The management terminal (SVP) 160 has management configuration information 161 such as a corresponding table showing correspondences between user IDs and the SLPRs.

Conventionally, one management table for the program-product information has been defined to cover the entirety of the storage subsystem. However, to implement the independent management functions in each SLPR, the program-product management table 122 is designed so that a division identifier (SLPR A, SLPR B, SLPR C, . . . ) is set per division unit (SLPR), and is a table capable of setting, as a P.P. flag, P.P. validity/invalidity of each division identifier.

In an example shown in FIG. 4, individual P.P. functions and P.P. flags each indicating whether the P.P. is valid or invalid (validity: "ON"; invalidity: "OFF") are set in response to the individual division identifiers.

In FIG. 4, as the P.P. functions, a LUNM function represents PORT management; a CVS function represents DISK management; a DCR function represents CACHE management; and HORC/HRC represents a remote-copy management function.

The program-product management table 122 is stored in the shared memory (SM) 120. This is because the program-product management table copes with both of configuration alterations made in response to command requests from the information processing device 200 such as each user's host computer connected to the port (PORT) and configuration alterations made in response to the operations of the management terminal 160 and/or the information processing device 210 connected to the management terminal 160. Thus, since the program-product management table 122 is stored in the shared memory (SM) 120, it can cope with requests for the configuration alterations with enhanced flexibility.

Note that, for the sake of explanation, FIG. 3 shows the example in which the storage subsystem 600 is divided into the three SLPRs and the channel control section (CHA) 110, the cache memory (CACHE) 130, the disk control section (DKA) 140, and the ECC group 350 are allocated in each SLPR. However, the present invention is not limited thereto, and may have a configuration in which the storage subsystem 600 is divided into a plurality of SLPRs or in which a plurality of channel control sections (CHA) 110, a plurality of disk control sections (DKA) 140, and a plurality of ECC groups 350 are allocated in one SLPR.

Further, the operation, in which resources such as physical resources and logical resources of the storage subsystem 600 are divided based on the SLPRs and the SLPRs are allocated to individual users, is detailed in Japanese Patent Application No. 2003-30363, which is incorporated herein. Additionally, the management of the individual resources in the SLPRs for individual users is detailed in Japanese Patent Application No. 2003-400515, which is incorporated herein.

According to the present embodiment, besides the control configuration information 121 for controlling the storage subsystem 600, the program management table 122 in which the P.P. validity/invalidity for each SLPR as shown in FIG. 4 is set is stored in the shared memory (SM) 120. By a program loaded into the microprocessor (MP) 119 in the channel control section (CHA) 110 of each SLPR, each function of the P.P. stored in the local memory (LM) 117 is executed. When the configuration alterations of each resource are made in the storage subsystem 600, the contents of the program-product management table 122 stored in the shared memory (SM) 120 are referenced, whereby the execution of each function in the P.P. is managed.

The individual programs loaded into the microprocessor (MP) 119 in the channel control section (CHA) 110 of each SLPR can execute the processing of the functions of all program products available in the storage subsystem 600, and can make configuration alterations for the individual resources in all the SLPRs. Additionally, by referring to the contents of the program-product management table 122 stored into the shared memory (SM) 120 at the time of executing the functions of the P.P., the execution of the program products for each user of the SLPRs is managed, thereby enabling different P.P. settings in the individual SLPRs to be provided.

For example, in the example shown in FIG. 3, P.P. settings for the individual SLPRs are provided in accordance with the contents of the program-product management table 122 so that, in the partition A of the SLPR A, PORT management function p.p. is present; CACHE management function P.P. is present; DISK management function P.P. is present; and the like. Similarly also in the partition B of the SLPR B and in the partition C of the SLPR C, the P.P. functions are set in accordance with the contents of the program-product management table 122.

Thus, the P.P. functions are set for the individual SLPRs. Therefore, when the user of each SLPR operates the management terminal 160 or the information processing device 210 connected to the management terminal 160 and uses the P.P. function to make the configuration alterations etc. of each resource, a set screen for only the P.P. set in the SLPR being used by the user can be displayed for the user.

Additionally, when configuration alteration requests for the individual resources from the users have been accepted, a configuration alteration request for a P.P. function other than those set in the SLPR being used by the user may be regarded as a non-settable error.

Like this embodiment, the program products can be independently set in the SLPRs. Therefore, for example, DISK utilization pay can be set independently of the division units, or division operation with enhanced flexibility can be made without depending on the resources themselves so that although a HORC function (remote copy function for open-system volume) is permitted, an HRC function (remote copy function for a mainframe-system volume) is not permitted.

Accordingly, it is possible to enhance usability of the storage subsystem management and the security of the system operation. Further, since services provided by storage service providers to individual customers can be set in greater detail, the customers can obtain value measured up to standards of the provided services.

<Operation of Storage Division Management>

Figure 6:
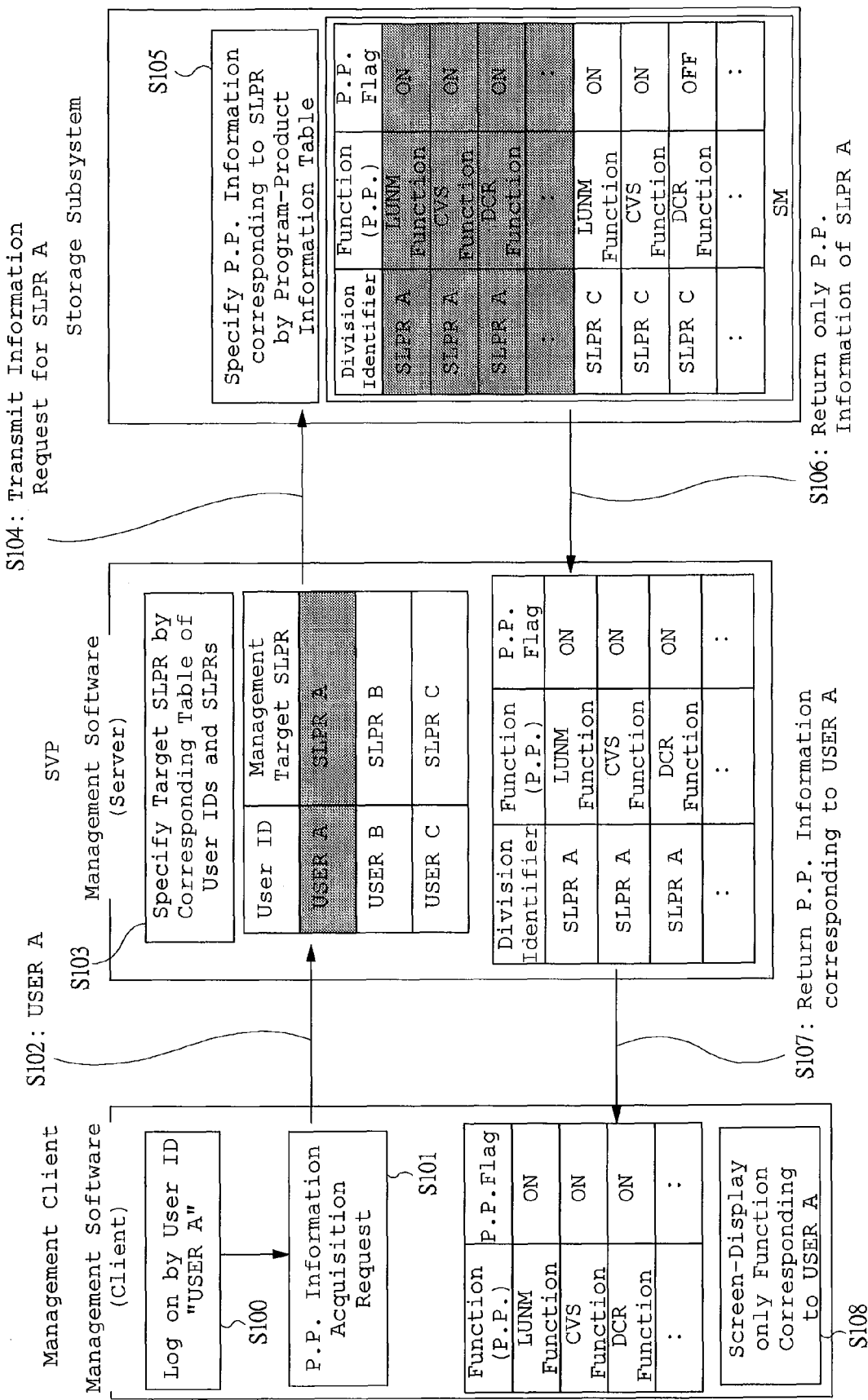
FIG. 6 is a flowchart showing operations among respective devices in a storage division management processing using the program-product management table in the storage management system according to the embodiment of the invention.
Figure 7:
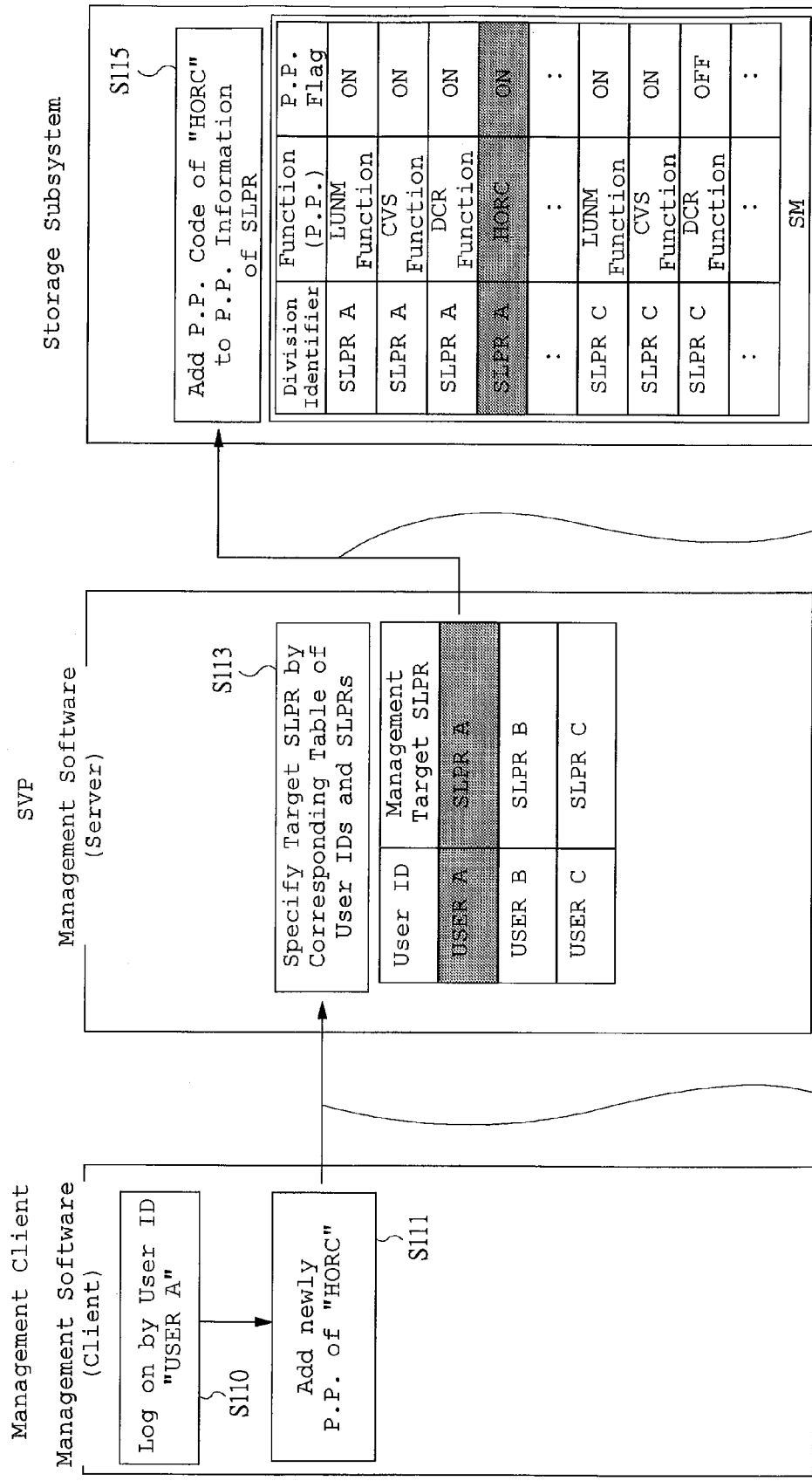
FIG. 7 is a flowchart showing operations among respective devices in a program-product setting processing to the program-product management table in the storage management system according to the embodiment of the invention.
Figure 8:
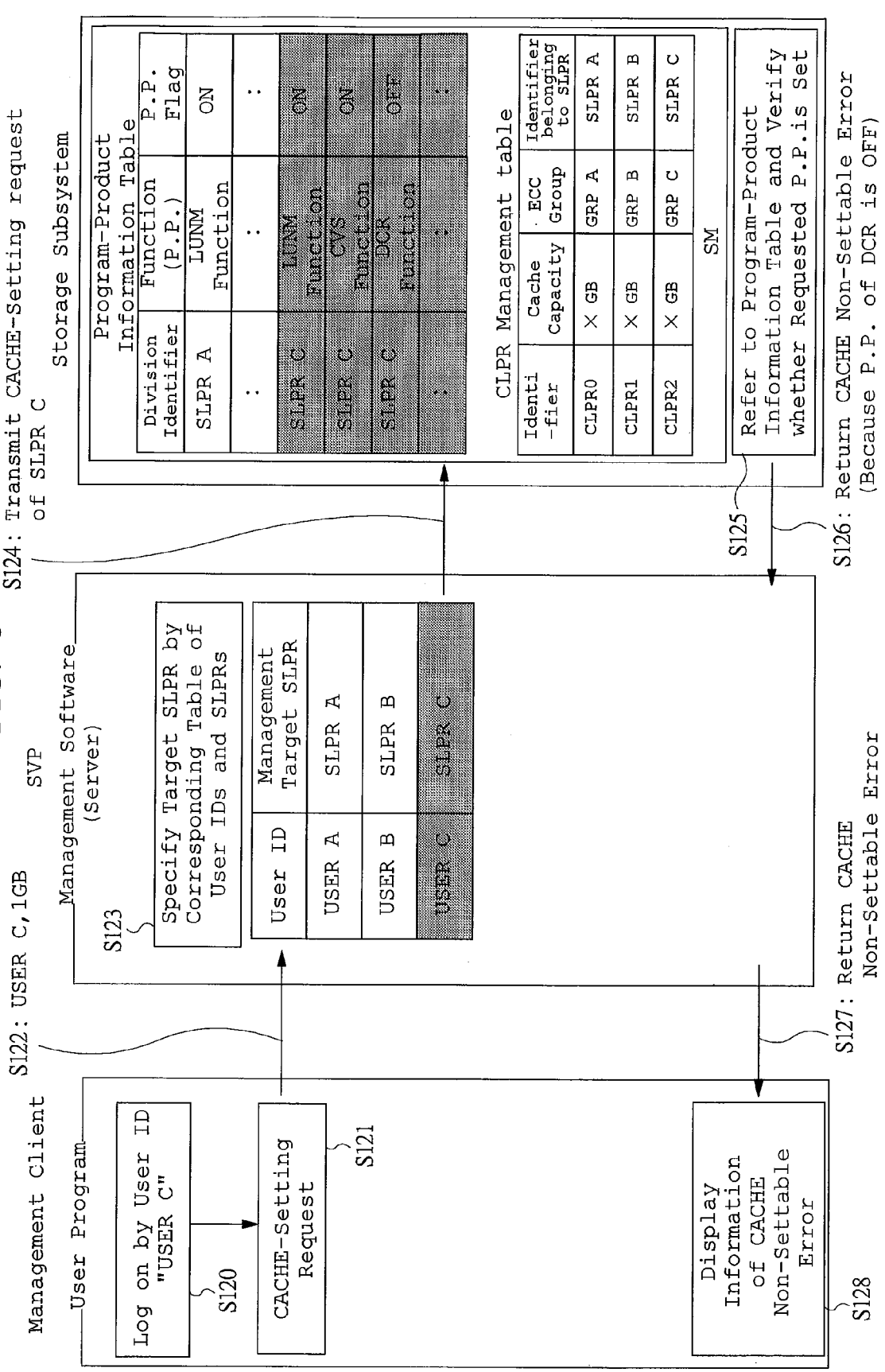
FIG. 8 is a flowchart showing operations among respective devices in an error processing after receiving a configuration altering request for function having no program product from a management client in the storage management system according to the embodiment of the invention.

Next, operations of storage division management of a storage management system according to one embodiment of the present invention will be described with reference to FIGS. 6 to 8. FIG. 6 is a flowchart showing operations among respective devices in storage division management processing using the program-product management table. FIG. 7 is a flowchart showing operations among respective devices in the setting processing of program products to the program-product management table. FIG. 8 is a flowchart showing operations among respective devices in an error processing at the time of receiving, from a management client, a configuration alteration request for a function a program product does not have.

First, as operations among the individual devices in the storage division management processing using the program-product management table, as shown in FIG. 6, for example, a user of the SLPR A (user ID: USER A) performs a logon operation from the information processing device 210 to be a management client by using management software (Client) on the information processing device 210 (S100).

In the information processing device 210, the logon operation by the user (user ID: USER A) is received by the management software (Client). Then, a processing of a program-product information acquisition request is performed through the operations by the user (S101), and the program-product information acquisition request together with logon information is transmitted to the management terminal (SVP) 160 (S102).

In the management terminal (SVP) 160, the management software (Server) executes a logon processing for the user, and refers to the corresponding table showing the relation between the user IDs of users and the SLPRs if user's validation is successfully achieved, and specifies the SLPR (SLPR A) of the user (user ID: USER A) (S103).

Subsequently, an information request for the P.P. corresponding to the SLPR (SLPR A) specified in S103 is transmitted to the storage subsystem 600 (S104).

In the storage subsystem 600, the contents of the program-product management table 122 stored in the shared memory (SM) 120 is referenced from the SLPR (SLPR A) to which the information request for the P.P. has been made from the management terminal (SVP) 160, whereby the P.P. information corresponding to the requested SLPR A is specified (S105).

Subsequently, only the P.P. information specified in S105 is returned to the management terminal (SVP) 160 (S106). In the management terminal (SVP) 160, the P.P. information returned from the storage subsystem 600 is verified by the management software (Server), and the P.P. information is returned to the information processing device 210 on which the user has been logged (S107).

In the information processing device 210, only the P.P. information returned from the management terminal (SVP) 160 is screen-displayed by the management software (Client), and other P.P. information is guarded (S108). More specifically, when the user of the SLPR (SLPR A) (user ID: USER A) is logged on, only the P.P. function permitted in the SLPR A is displayed on the screen of the information processing device 210. However, the P.P. information not permitted in the SLPR A is not displayed thereon. Accordingly, the user (user ID: USER A) of the SLPR A can operate only the permitted P.P. function from on the information processing device 210.

Thus, since management screens of the P.P. functions not permitted in each division unit (SLPR) can be masked, configuration setting errors etc. can be prevented and, consequently, security of the entire system can be enhanced.

Additionally, as shown in FIG. 6, since the management terminal (SVP) 160 on a side of the management software (Server) has the corresponding table showing the relations between the user IDs and the SLPRs, it on a side of the management client can implement flexible operations without considering the division units (SLPRs).

Note that, in this embodiment, the users do not consider the table being managed over the shared memory (SM) 120 of the storage subsystem 600. This is because it is necessary to consider the settings produced in response to command request from a host computer not having a user's concept.

In operations between the individual devices in the setting processing of the program products to the program-product management table, as shown in FIG. 7, for example, the user of the SLPR A (user ID: USER A) performs a logon operation from the information processing device 210 to be a management client on the management software (Client) (S110).

In the information processing device 210, by the management software (Client), the logon operation from the user (user ID: USER A) is received, and a processing for newly adding a P.P. of "HORC" is performed through the user's operation (S111). In this case, the user inputs a code etc. for adding the P.P. issued at the time of purchasing a P.P., whereby it is determined whether the P.P. is added. Then, a additional request for the P.P. codes together with the user's logon information is transmitted to the management terminal (SVP) 160 (S112).

In the management terminal (SVP) 160, by the management software (Server), execution of a logon processing for the user is made, and the corresponding table showing the relations between the user IDs of users and the SLPRs is referred to if user validation is successfully achieved, and an SLPR (SLPR A) of the user (user ID: USER A) is specified (S113).

Subsequently, an addition request for the P.P. code of "HORC" corresponding to the SLPR (SLPR A) specified in S113 is transmitted to the storage subsystem 600 (S114).

In the storage subsystem 600, with respect to the SLPR (SLPR A) to which the addition request for the P.P. code has been issued from the management terminal (SVP) 160, the P.P. flag in the program-product management table 122 stored in the shared memory (SM) 120 is validated (ON) and the P.P. code is added (S115).

Also in the case of deleting the P.P. similarly thereto, when there are instructions to delete the P.P. through the user operation, a deletion request for the P.P. code is transmitted to the storage subsystem 600. Then, in the storage subsystem 600, with respect to the SLPR (SLPR A) to which the deletion request for the P.P. code has been issued from the management terminal (SVP) 160, the P.P. flag in the program-product management table 122 stored in the shared memory (SM) 120 is invalidated (OFF) and the P.P. code is deleted.

In this manner, by the operations from a side of the management client being used by the user, the function addition/ deletion processing of the P.P. of the SLPR being used by the user can easily be performed by validating (ON)/invalidating (OFF) the P.P. flag in the program-product management table 122 stored into the shared memory (SM) 120. After the P.P. flag in the program-product management table 122 has been updated, the management of the P.P. functions in units of the SLPR can be securely performed based on the above-mentioned information.

Further, in the example shown in FIG. 6, only the function logged on and corresponding to the user is displayed on the screen of the management client operated by the user. Accordingly, the user does not transmit the configuration alteration request for the function having no P.P. from the management client.

However, in a case where, for example, the management client is configured by the user program, the configuration alteration request for the function having no P.P. can be received in some cases due to faults etc. of the user program. Additionally, in the storage subsystem 600, there can be received also the configuration alteration instructions due to in-band from, for example, a side of the host connected to the port of the channel control section 110, so that this case is also the same. For this reason, checking presence or absence of the P.P. function at the time of receiving the configuration alteration request is required, by referring to the program-product management table 122 stored in the shared memory 120 of the storage subsystem 600.

For example, as operations among the individual devices in an error processing at the time of receiving the configuration alteration request for the function having no P.P. from the management client, as shown in FIG. 8, for example, a user (user ID: USER C) of the SLPR C performs a logon operation from the information processing device 210 to be a management client, by using a user program on the information processing device 210 (S120).

In the information processing device 210, the user program receives a log-on operation from the user (user ID: USER C), and a CACHE-setting request processing is performed through the operation by the user (S121). At this time, there is a possibility that the user program will receive a setting request for a P.P. function other than those permitted in the SLPR of the user, so that there is a probability that the CACHE-setting request from the user will be made nothing in the P.P. function permitted in the SLPR of the user.

In the management terminal (SVP) 160, by the management software (Server), execution of a logon processing of the user is made, and the corresponding table showing the relations between the user IDs of the users and the SLPRs is referred to if user validation is successfully achieved, and an SLPR (SLPR C) of the user (user ID: USER C) is specified (S123).

Subsequently, the CACHE-setting request for the SLPR (SLPR C) specified in S123 is transmitted to the storage subsystem 600 (S124).

In the storage subsystem 600, in accordance with the CACHE-setting request from the management terminal (SVP) 160, a verification is performed by referring to the contents of the program-product management table 122 stored in the shared memory (SM) 120 to determine whether the P.P. having a DCR function required for the CACHE setting is set in the SLPR (SLPR C) of the user (S125).

As a result of the verification in S125, for example, the P.P. flag of the SLPR (SLPR C) of the user in the program-product management table 122 with respect to the P.P. having the DCR function required for the CACHE setting is invalid (OFF). Therefore, a CACHE non-settable error is returned to the management terminal (SVP) 160 (S126) and, in the management terminal (SVP) 160, by the management software (Server), the CACHE non-settable error returned from the storage subsystem 600 is returned to the information processing device 210 on which the user is logged (S127).

In the information processing device 210, by the user program, information on the CACHE non-settable error is screen-displayed, and the user is notified that the requested CACHE setting cannot be executed (S128).

Also at the time of receiving configuration alteration instructions due to in-band from, for example, a side of the host connected to the port of the channel control section (CHA) 110 is received similarly thereto, the configuration alteration instructions (e.g., CACHE setting) from, for example, the side of the host are received in the storage subsystem 600 similarly to S124 in FIG. 8. Further, similarly to S125 in FIG. 8, a verification is performed by referring to the contents of the program-product management table 122 stored in the shared memory (SM) 120 to determine whether the P.P. having the DCR function required for the CACHE setting is set in the SLPR (SLPR C). Similarly to S126 in FIG. 8, if the setting is impossible, the non-settable error is returned to the host side.

<Processing in Reception of Configuration Alteration Request>

Figure 9:
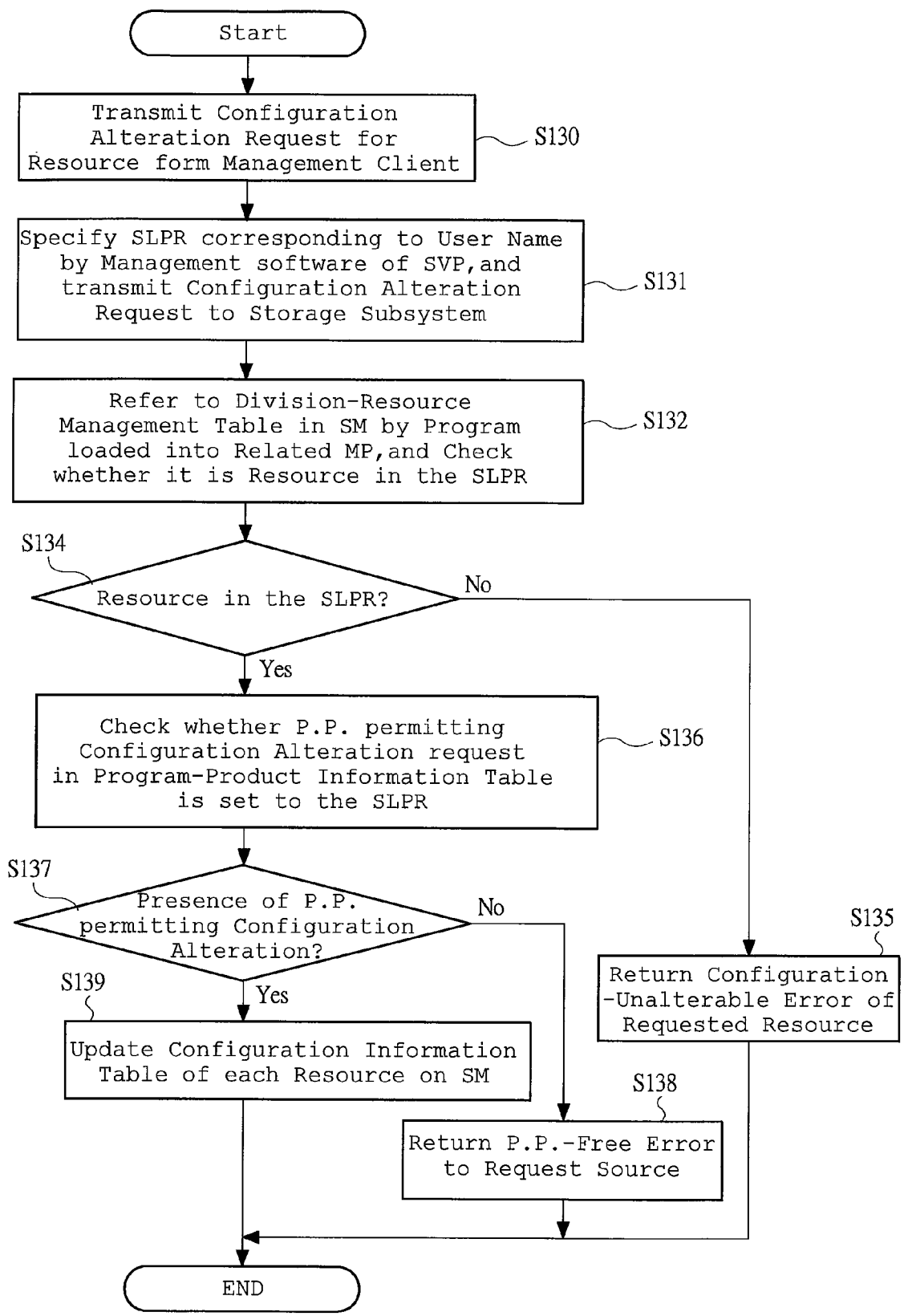
FIG. 9 is a flowchart showing processing after receiving a configuration alteration request from an information processing device serving as a management client in the storage management system according to the embodiment of the invention.
Figure 10:
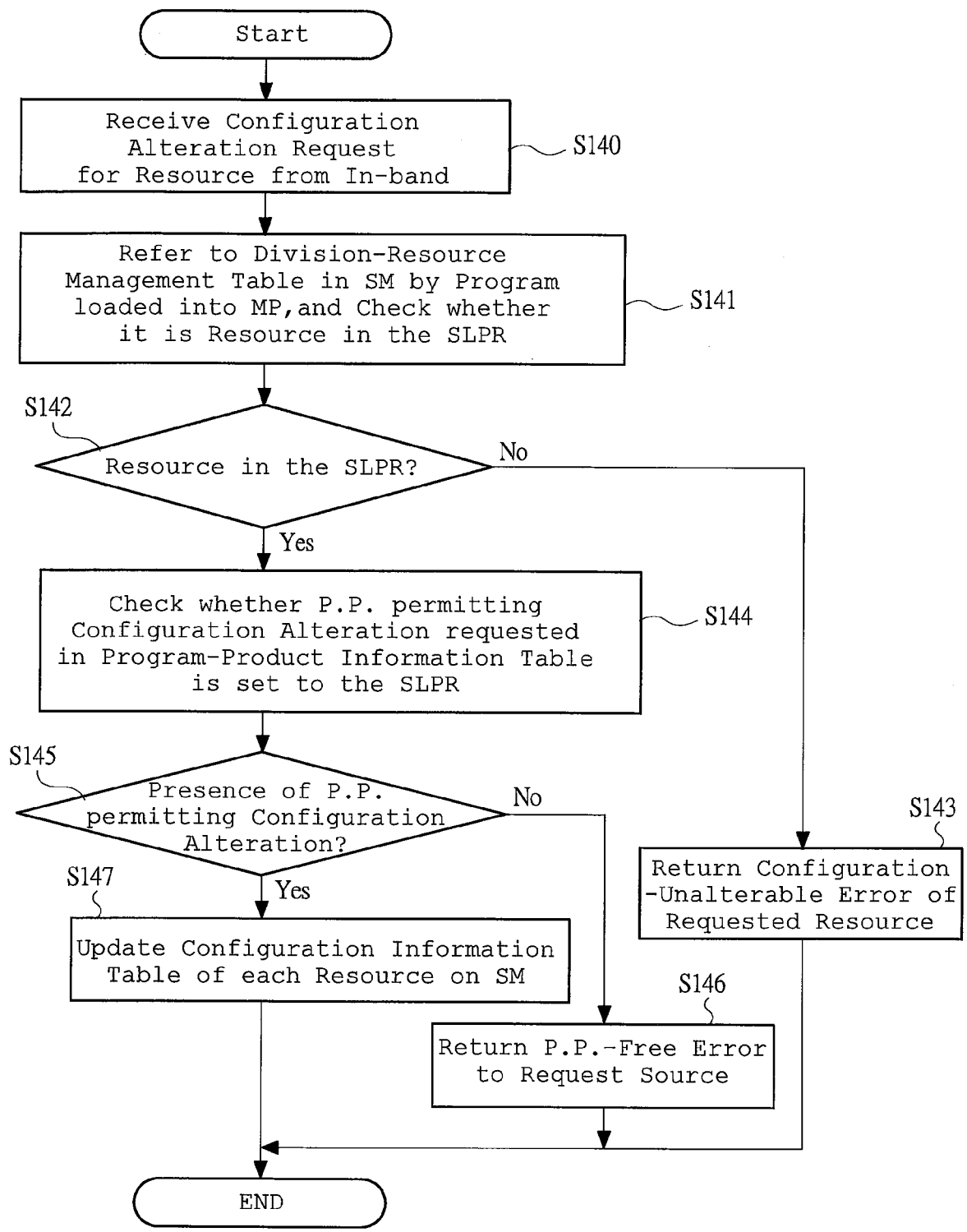
FIG. 10 is a flowchart showing a processing after reviving a configuration altering request due to in-band from a host side etc. coupled to a port of a channel control section in the storage management system according to the embodiment of the invention.

Next, with reference to FIGS. 9 and 10, a description will be made of a processing at the time of receiving a configuration alteration request, the processing including an error processing at the time of receiving a configuration alteration request for a function having no P.P. from, for example, a management client or an in-band source. FIG. 9 is a flowchart showing a processing at the time of receiving a configuration alteration request from an information processing device to be a management client. FIG. 10 is a flowchart showing a processing at the time of receiving a configuration alteration request due to an in-band from, for example, a side of a host coupled to a port of a channel control section.

First, as shown in FIG. 9, in the processing at the time of receiving a configuration alteration request from an information processing device to be a management client, the user performs a logon operation from the management client, and transmits a configuration alteration request for a resource from the management client to the management terminal (SVP) 160 through a user operation (S130).

In the management terminal (SVP) 160, the corresponding table showing the relations between the user IDs and the SLPRs of the users is referred to by the management software (Server), and an SLPR corresponding to a logged-on user name is specified, and the configuration alteration request is transmitted to the storage subsystem 600 (S131). The configuration alteration request contains information that specifies the SLPR.

In the storage subsystem 600, a program loaded into the microprocessor (MP) 119 in the related channel control section (CHA) 110 refers to the division-resource management table 123 stored in the shared memory (SM) 120 as shown in FIG. 5, and checks whether the requested resource is a resource in the SLPR (S132). Note that, in the program loaded into the microprocessor (MP) 119, configuration alterations of the resources in all the SLPRs can be made and the execution of the processing of the functions of all the program products can be made.

By the check in S132, it is determined whether the requested resource is a resource in the SLPR (S134). If it is determined in S134 that the requested resource is not a resource in the SLPR, a configuration-unalterable error of the requested resource is returned to the management terminal (SVP) 160 and error information on the configuration-unalterable error of the resource is displayed to the management client of the user (S135).

If it is determined in S134 that the requested resource is a resource in the SLPR, the contents of the program-product management table 122 stored in the shared memory (SM) 120 are referred to and, thereby, it is checked whether the P.P. permitting the requested configuration alteration is set in the SLPR (S136). For example, in the case of performing a configuration alteration of CACHE, the presence or absence of the P.P. for DCR is checked.

By the check in S136, it is determined whether the P.P. permitting the requested configuration alteration is present (S137). If it is determined in S137 that the P.P. permitting the configuration alteration is absent, a P.P.-free error is returned to the management terminal (SVP) 160 and information on the P.P.-free error is displayed in the management client of the user (S138).

If it is determined in S137 that the P.P. permitting the configuration alteration is present, the configuration information table of the individual resources in the shared memory (SM) 120 is updated (S139).

Additionally, as shown in FIG. 10, in the processing at the time of receiving a configuration alteration request due to in-band from, for example, the side of the host connected to the port of the channel control section, the storage subsystem 600 receives the configuration alteration request for the resource from the in-band (S140).

As shown in FIG. 5, the program loaded into the microprocessor (MP) 119 in the related channel control section (CHA) 110 refers to the division-resource management table 123 stored in the shared memory (SM) 120, and checks whether the requested resource is a resource in the SLPR (S141). Note that, in the program loaded into the microprocessor (MP) 119, the configuration alterations of the resources in all the SLPRs can be made and the processing to the functions of all the program products can be executed.

By the check in S141, it is determined whether the requested resource is a resource in the SLPR (S142). If it is determined in S142 that the requested resource is not a resource in the SLPR, the configuration-unalterable error of the requested resource is returned to the host side (S143).

If it is determined in S142 that the requested resource is a resource in the SLPR, the contents of the program-product management table 122 stored in the shared memory (SM) 120 are referred to and, thereby, it is checked whether the P.P. permitting the requested configuration alteration is set in the SLPR (S144). For example, in the case of performing the configuration alteration of the CACHE, the presence or absence of the P.P. for DCR is checked.

By the check in S144, it is determined whether the P.P. permitting the requested configuration alteration is present (S145). If it is determined in S145 that the P.P. permitting the configuration alteration is absent, the P.P.-free error is returned to the host side (S146).

If it is determined in S145 that the P.P. permitting the configuration alteration is present, the configuration information table of the individual resources in the shared memory (SM) 120 is updated (S147).

Thus, in the program loaded into the microprocessor (MP) 119, the configuration alterations of the resources in all the SLPRs can be made, and the processing to the functions of all the program products can be performed. Whether the actually requested processing is to be executed is determined based on the program-product management table 122 that is managed in the shared memory (SM) 120. by having, on the shared memory (SM) 120, management information such as the program-product management table 122, not only requests from the in-band but also requests from the management software (Server) in the SVP can easily be coped with.

Additionally, by checking not only whether the requested resource alteration corresponds to the resource in the SLPR but also whether it is the function permitted by the P.P., it is possible to perform a secure system operation in the division management.

Note that, in this embodiment, there has been described the example in which, by the program loaded into the microprocessor (MP) 119 in the channel control section (CHA) 110, the program-product management table 122 stored in the shared memory (SM) 120 is referred to and the individual functions of the program products stored in the local memory (LM) 117 in the channel control sections (CHA) 110 are executed. However, the present invention is not limited to the above-mentioned embodiment, and may have a configuration in which, by the microprocessor in the resource in each division unit, the program-product management table 122 stored in the shared memory (SM) 120 is referred to and the individual functions of the program products stored in the individual division units are executed.

Additionally, in this embodiment, the example in which the user performs the logon operation from the information processing device 210 to be a management client has been described. However, the present invention may have a configuration in which the user directly operates the management terminal (SVP) 160 to be logged on and performs operations similar to those with the management client.

According to the present embodiment, since the P.P. functions are set with respect to the individual division units, the functions provided by the program product in each division unit can be implemented, whereby the division management operation with enhanced security can be implemented.

Further, when the configuration alterations etc. are performed for the individual resources by using the P.P. functions, the set screen of only the program products set in the division unit being used by the user can be displayed with respect to the user. Consequently, it is possible to enhance security of the entirety of the system.

What is claimed is:

1. A storage management method partitioning a physical resource and a logical resource in a storage subsystem, allocating a management user per partition unit, and performing partition management of each of said resources, the storage subsystem having a plurality of channel adapters coupled to a host computer and receiving data from the host computer, a cache memory temporarily storing data sent from the channel adapters, a plurality of disk adapters receiving data stored in the cache memory, a shared memory, a plurality of physical disks connected to said disk adapters and storing data sent from the disk adapters, and a switch for connecting said plurality of channel adapters, said plurality of disk adapters, said shared memory, and said cache memory, the storage management method comprising the steps of:

storing, in said shared memory in said storage subsystem, program-product management information showing presence or absence of a program product that provides a configuration-changing function for each of said resources, said resources including partitioned channel adapters, a partitioned cache memory, and a logical disk drive group relating to a storage area of the physical disks, in a partition unit, the program product of said partition unit including a remote copy function;

receiving a request from said management user to access the configuration-changing functions provided by the program product of the partition unit of said management user;

in response to receiving said request, said program-product management information is referenced to determine and specify the partition unit of said management user, based on information contained in said request;

in response to an instruction received from said management user to execute a configuration-changing function provided by the program product of the partition unit of said management unit, referring to said program-product management information at the time of executing the configuration-changing function by said program product of each of said resources in the partition unit of said management user; and restricting execution of the configuration-changing function of a resource without said program product.

2. The storage management method according to claim 1, further comprising the step of:

referring to said program-product management information to provide, to said management user, an operation screen having only a configuration-changing function in which said program product is present with respect to the partition unit of said management user.

3. The storage management method according to claim 1, further comprising the step of:

at the time of having an instruction to add or delete said program product from said management user, changing information that shows presence or absence in said program-product management information with respect to said program product instructed.

4. The storage management method according to claim 1, further comprising the step of:

at the time of receiving said instruction of a configuration-changing request of each of said resources from said management user, returning, to said management user, a configuration-unchangeable error if a resource of the configuration-changing request is not a resource in the partition unit of said management user.

5. A storage management system partitioning a physical resource and a logical resource in a storage subsystem, allocating a management user per partition unit, and performing partition management of each of said resources, the storage subsystem having a plurality of channel adapters coupled to a host computer and receiving data from the host computer, a cache memory temporarily storing data sent from the channel adapters, a plurality of disk adapters receiving data stored in the cache memory, a plurality of physical disks connected to said disk adapters and storing data sent from the disk adapters, a shared memory, and a switch for connecting said plurality of channel adapters, said plurality of disk adapters, said shared memory, and said cache memory, the storage management system comprising:

program-product management information stored in said shared memory in said storage subsystem and showing presence or absence of a program product that provides a configuration-changing function of each of said resources, said resources including partitioned channel adapters, a partitioned cache memory, and a logical disk drive group relating to a storage area of the physical disks, in a partition unit, the program product of said partition unit including a remote copy function, wherein, in response to receiving a request from said management user to access the configuration-changing functions provided by the program product of the partition unit of said management user, said program-product management information is referenced to determine and specify the partition unit of said management user, based on information contained in said request, and wherein, in response to an instruction received from said management user to execute a configuration-changing function provided by the program product of the partition unit of said management user, at the time of executing the configuration-changing function by said program product of each of said resources in the partition unit of said management user, said program-product management information is referenced to restrict execution of the configuration-changing function of a resource without said program-product management information.

6. The storage management system according to claim 5, further comprising:

a management client connected to said storage subsystem, said management user performing management for each of the resources in said partition unit by using the management client, wherein, at the time of displaying, from said management client, an operation screen of a configuration-changing function by said program product, said program-product management information is referred to and the operation screen of only the configuration-changing function having said program product is displayed.

7. The storage management system according to claim 6, wherein, at the time of having an instruction to add or delete said program product from said management client, information showing presence or absence said program-product management information is changed with respect to said program product instructed.

8. The storage management system according to claim 6, wherein, at the time of receiving said instruction of a configuration-changing request for each of said resources from said management client, if a resource of the instructed configuration-changing request is not a resource in the partition unit of said management user, a configuration-unchangeable error is returned to said management user.

9. The storage management system according to claim 6, further comprising:

a management terminal connected to said storage subsystem and said management client and performing a logon processing for the management user from said management client, wherein said management terminal receives said request from said management user via said management client and specifies the partition unit of said management user in accordance with logon information of said management user received from said management client.

10. The storage management system according to claim 5, wherein, at the time of receiving said instruction of a configuration-changing request for each of said resources from a host computer of said management user, the host computer being connected to the partition unit of said storage subsystem, if a resource of the instructed configuration-changing request is not a resource in the partition unit to which said host computer is connected, a configuration-unchangeable error is returned to said host computer.

* * * * *